United States Patent
Park et al.

(10) Patent No.: US 11,922,333 B2
(45) Date of Patent: Mar. 5, 2024

(54) METHOD FOR TRAINING INFORMATION RETRIEVAL MODEL BASED ON WEAK-SUPERVISION AND METHOD FOR PROVIDING SEARCH RESULT USING SUCH MODEL

(71) Applicants: Hoseo University Academic Cooperation Foundation, Asan-si (KR); Livin AI Inc., Cheonan-si (KR)

(72) Inventors: Sungbum Park, Yongin-si (KR); Suehyun Chang, Seoul (KR); Geun Jin Ahn, Bucheon-si (KR)

(73) Assignees: HOSEO UNIVERSITY ACADEMIC COOPERATION FOUNDATION, Asan-si (KR); LIVIN AI INC., Cheonan-si (KR)

(*) Notice: Subject to any disclaimer, the term of this patent is extended or adjusted under 35 U.S.C. 154(b) by 0 days.

(21) Appl. No.: 17/744,847

(22) Filed: May 16, 2022

(65) Prior Publication Data
US 2022/0343195 A1    Oct. 27, 2022

Related U.S. Application Data

(63) Continuation of application No. 17/245,435, filed on Apr. 30, 2021, now abandoned.

(30) Foreign Application Priority Data

May 1, 2020 (KR) .................. 10-2020-0053018

(51) Int. Cl.
   *G06N 5/04*     (2023.01)
   *G06F 16/93*    (2019.01)
   *G06N 20/00*    (2019.01)

(52) U.S. Cl.
   CPC ............... *G06N 5/04* (2013.01); *G06F 16/93* (2019.01); *G06N 20/00* (2019.01)

(58) Field of Classification Search
   CPC .......... G06N 5/04; G06N 20/00; G06F 16/93
   USPC ......................................................... 706/12
   See application file for complete search history.

(56) References Cited

U.S. PATENT DOCUMENTS

2019/0303375 A1* 10/2019 Bai ..................... G06F 16/9535
2020/0074984 A1*  3/2020 Ho ...................... G10L 15/1815

* cited by examiner

*Primary Examiner* — Hosain T Alam
*Assistant Examiner* — Nicholas E Allen
(74) *Attorney, Agent, or Firm* — LEX IP MEISTER, PLLC

(57) ABSTRACT

A search method using an artificial intelligence based information retrieval model and a method for training the artificial intelligence based information retrieval model used for the method are provided.

In the method, even if there is no labeled data and only a corpus exists, the artificial intelligence based information retrieval model can be trained using the weak-supervision methodology. Search can be performed by dividing documents into passages having short lengths. Compared to an information retrieval model based on unsupervised learning, improved search results are provided.

4 Claims, 7 Drawing Sheets

[Fig. 1]
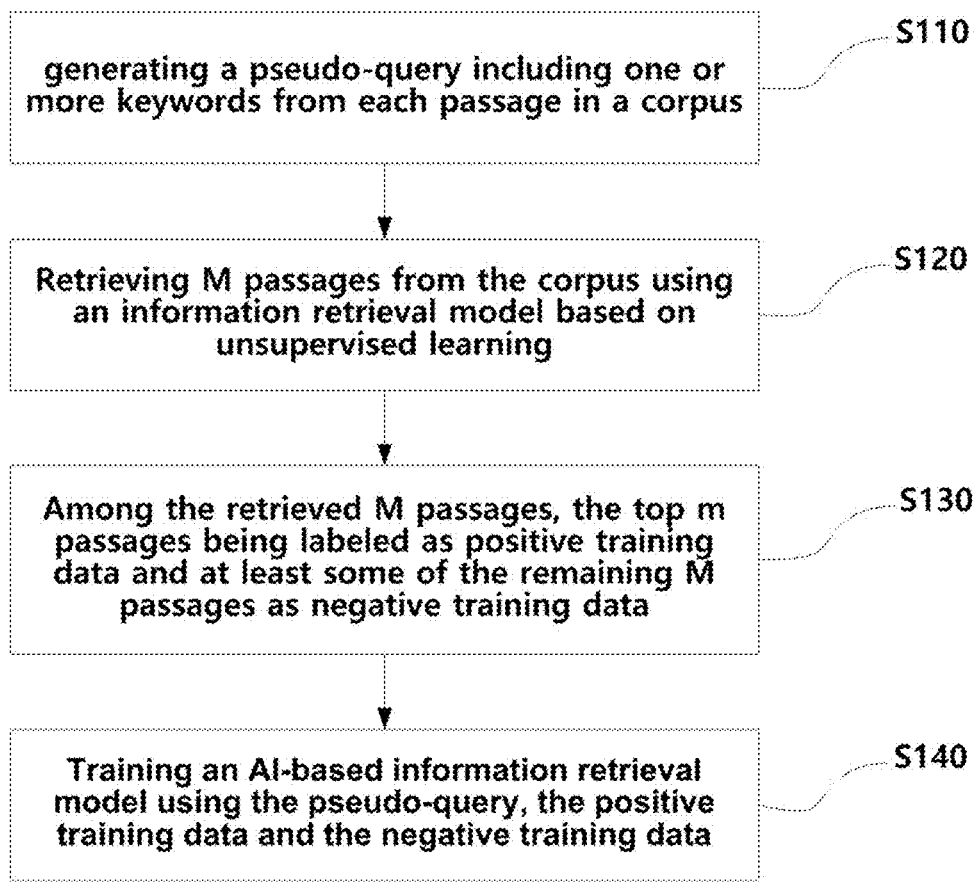

[Fig. 2]
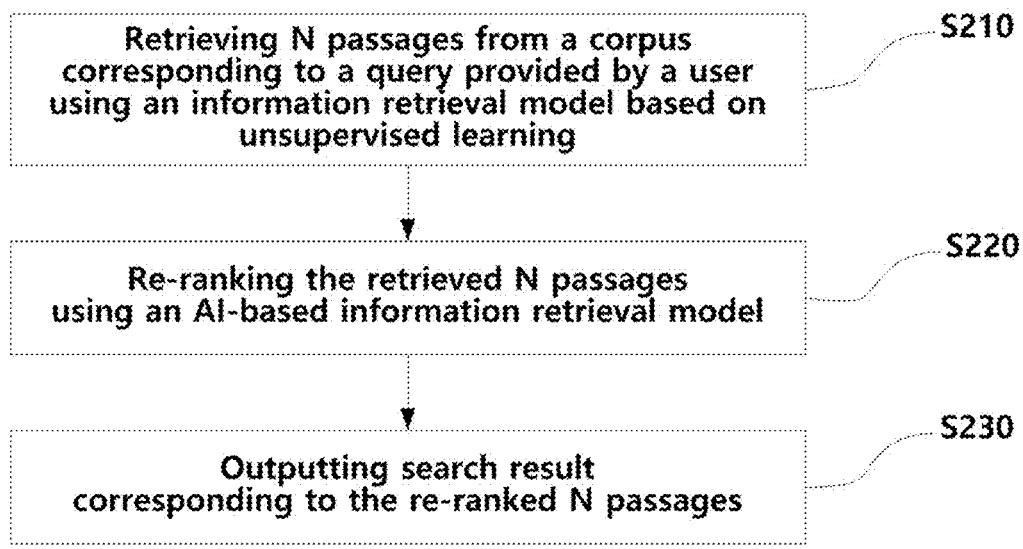

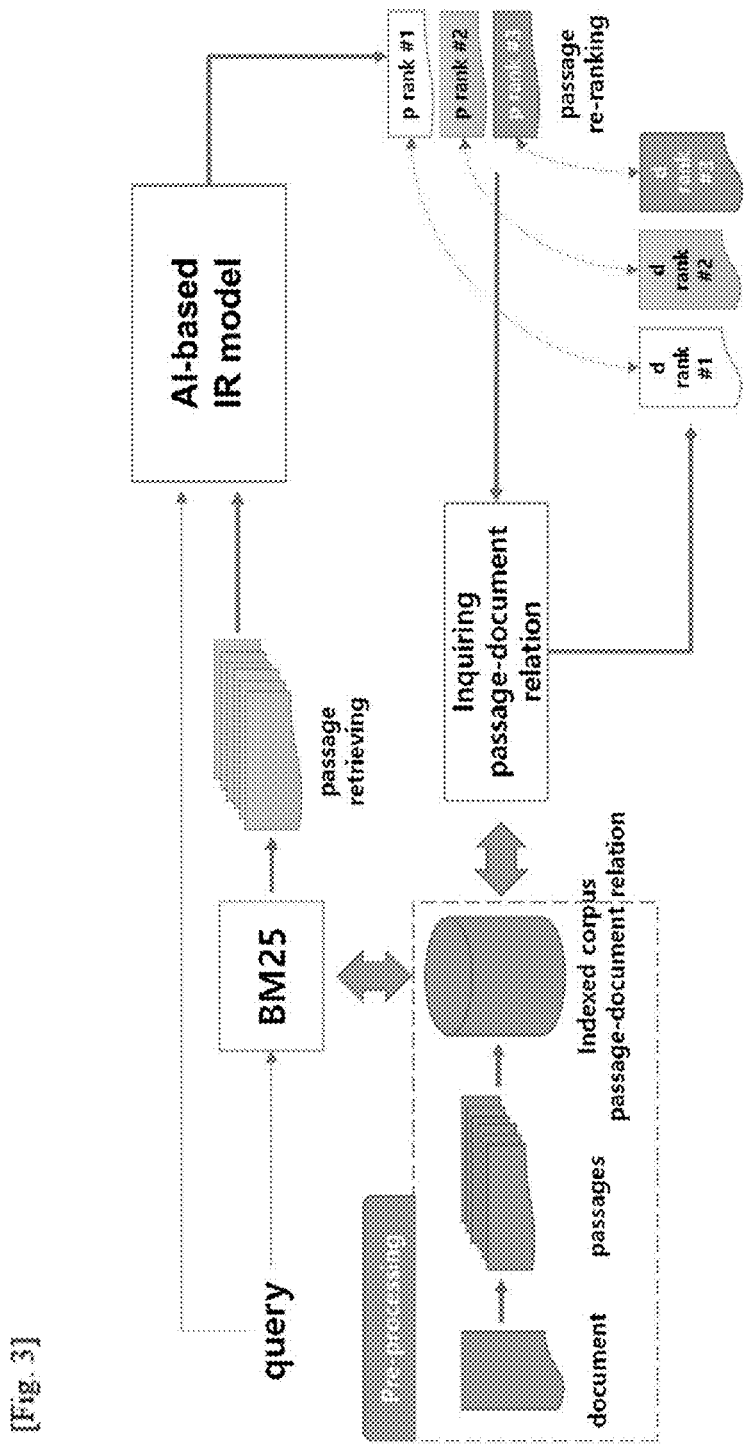
[Fig. 3]

[Fig. 4]
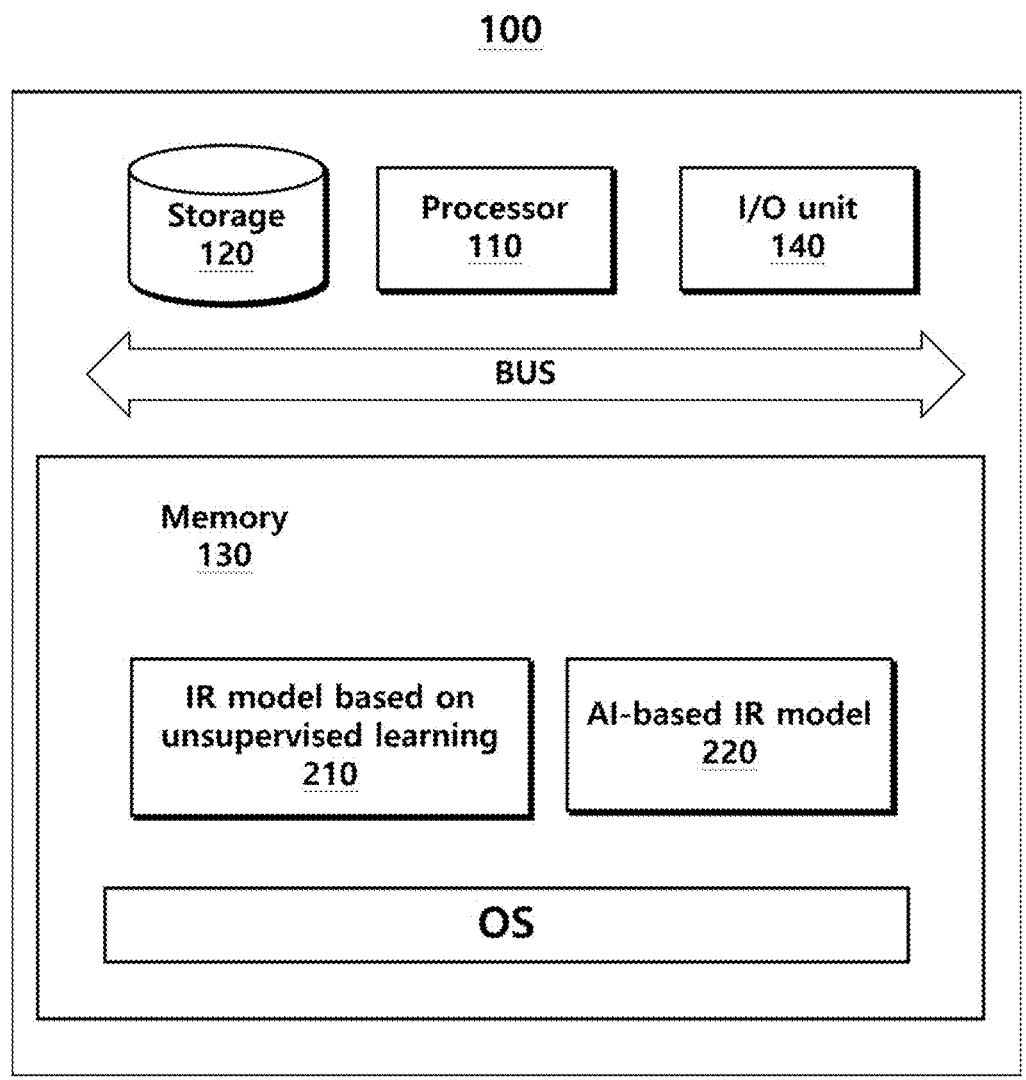

[Fig. 5]
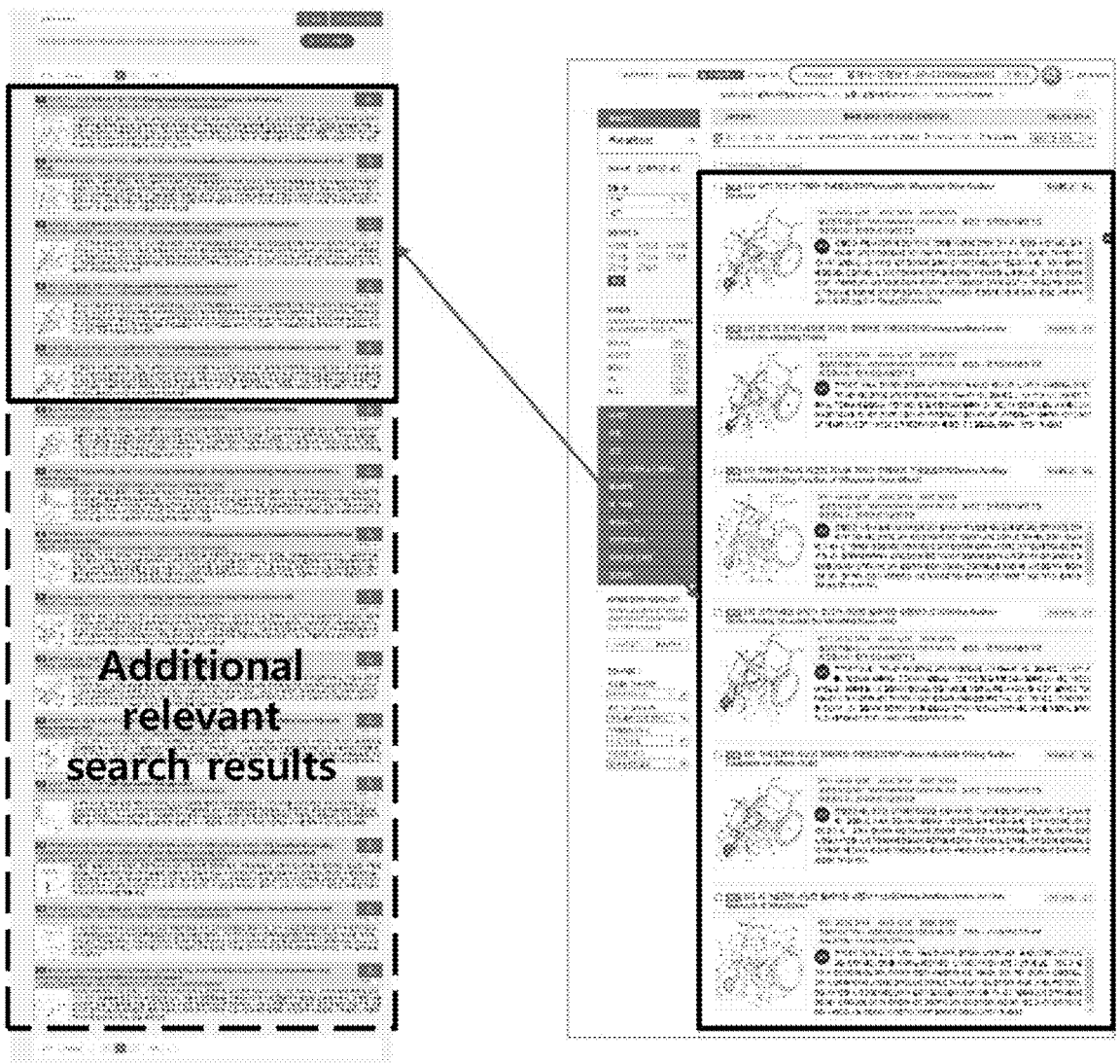

[Fig. 6]
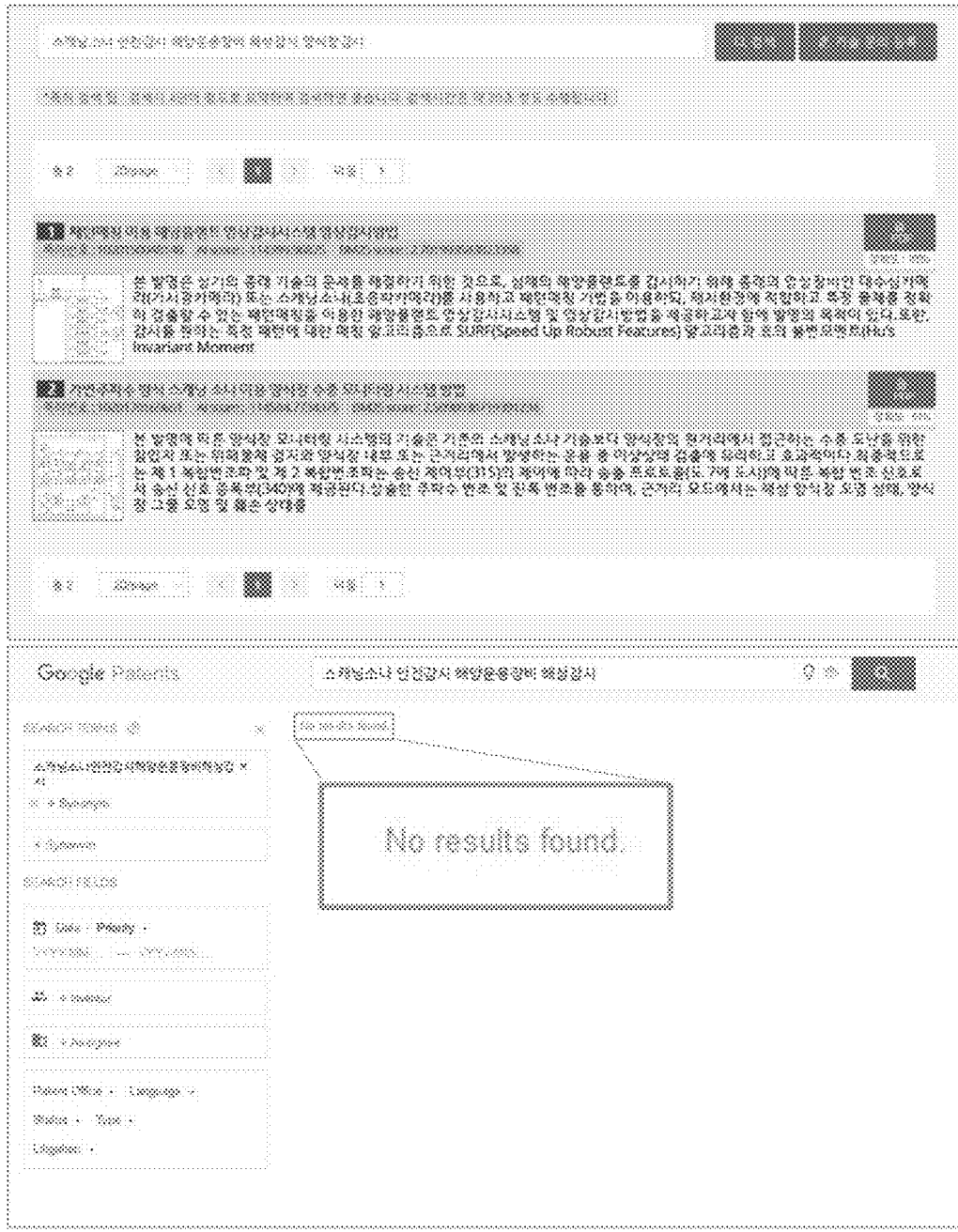

[Fig. 7]

| App. No. | Preamble Order | 1st Comp. Order | 2nd Comp. Order | Aggregation Order | AI Score | BM25 Score | Ensemble |
|---|---|---|---|---|---|---|---|
| KR20100135979 | 4 | 1 | 1 | 6 | | 5.378932873 | |
| KR20100028163 | 7 | 4 | 2 | 13 | | 9.648079628 | |
| KR20100067494 | 2 | 5 | 11 | 18 | 7511.007813 | 4.490020995 | |
| KR20100028166 | 15 | 8 | 5 | 28 | | | |
| KR20100028157 | 26 | 2 | 3 | 31 | | 9.780725574 | |
| KR20100067503 | 12 | 15 | 10 | 37 | 7587.914063 | 4.128199808 | |
| KR20100028134 | 29 | 6 | 4 | 39 | | 8.815984928 | |
| KR20110001557 | 36 | 10 | 6 | 52 | | | |
| KR20100028151 | 32 | 14 | 7 | 53 | 7587.460938 | 7.830120238 | |
| KR20110048108 | 41 | 7 | 8 | 56 | | 5.906006987 | |
| KR20110028939 | 40 | 20 | 14 | 74 | | 4.358423933 | 764.8461685 |
| KR20110048099 | 61 | 16 | 12 | 89 | | | |
| KR20110048193 | 59 | 30 | 13 | 102 | 7786.929688 | 6.17363455 | 773.1366977 |
| KR20150058326 | 82 | 81 | 68 | | -8117.546875 | 4.773376243 | -807.4586489 |

METHOD FOR TRAINING INFORMATION RETRIEVAL MODEL BASED ON WEAK-SUPERVISION AND METHOD FOR PROVIDING SEARCH RESULT USING SUCH MODEL

BACKGROUND OF THE INVENTION

1. Field of the Invention

The present invention relates to a method for training an information retrieval model based on the weak supervision and a method for providing a search result using the information retrieval model (hereinafter, "IR model") trained by this method, and more specifically, to a method for generating pseudo-labels and training an IR model by the pseudo-labels when labels for supervised learning of an artificial intelligence based IR model do not exist and also to a method for providing search results for the query entered by the user by using the IR model.

2. Description of the Related Art

Information retrieval has been continuously developed since Google introduced the PageRank based search technology based on graph theory. This search technique was based on unsupervised learning, and it was possible to search if only a documents corpus was given. BM25 is a representative IR technology based on unsupervised learning, and it shows very improved performance when used with a query expansion technique called RM3. As an open source, Anserini is widely used in the academic and the practical fields.

In the field of natural language processing, various IR models have been proposed according to research in the academic field to apply artificial intelligence techniques. For example, deep learning based IR models such as DRMM, KNRM, and PACRR have been proposed. BERT, released by Google in 2018, has shown good performance in various natural language processing fields, and studies have been conducted to use BERT as an IR model based on a transformer or a language model.

In the Ad-Hoc Information Retrieval section of Paper With Code, a website that introduces artificial intelligence models having open source in each field, it is possible to identify the SOTA (State-of-the-Art) IR model, that is, the artificial intelligence based IR model that exhibits the best performance at the present time, including Anserini, a search model based on unsupervised learning.

According to a researcher at the University of Waterloo, Canada, named Jimmy Lin, the performance of deep learning IR models before BERT, i.e., DRMM, KNRM, and PACRR, are similar or worse compared to Anserini, a search model based on unsupervised learning, the models proposed after BERT are said to have improved performance over Anserini (Lin, Jimmy. "The Neural Hype, Justified! A Recantation."). Such matters can also be checked on the leader board of the Ad-Hoc Information Retrieval section of Paper With Code described above. From these academic research results, it can be seen that the accuracy of the search results can be improved by the IR model based on artificial intelligence.

However, there are some limitations to the artificial intelligence based IR model. In order to use an artificial intelligence based IR model for inference, it must first be trained, and such learning requires a large amount of labeled data. Labeled data is basically processed and provided by humans, but it is uneconomical because the cost for labeling is too high when considering the amount of data required for learning. As another problem, IR models based on unsupervised learning generally do not matter even if the length of the document is long, but most of the IR models based on artificial intelligence have limitations in the length of documents that can be processed. For example, in the case of BERT, the maximum number of tokens that can be processed is limited to 512. Therefore, there is no problem in the case of searching for a corpus consisting of short texts, but it is difficult to apply in the case of searching for long documents such as patents and papers.

Prior Arts

[1] https://paperswithcode.com/task/ad-hoc-information-retrieval

[2] MacAvaney, Sean, et al. "CEDR: Contextualized embeddings for document ranking." Proceedings of the 42nd International ACM SIGIR Conference on Research and Development in Information Retrieval. 2019.

[3] Dai, Zhuyun, and Jamie Callan. "Deeper text understanding for IR with contextual neural language modeling." Proceedings of the 42nd International ACM SIGIR Conference on Research and Development in Information Retrieval. 2019.

SUMMARY OF THE INVENTION

The present invention is to solve the above-described problem and an object of the present invention is to provide a method for training an artificial intelligence based IR model even when there is no labeled data and only a corpus is given.

Another object of the present invention is to provide a search method using an artificial intelligence based search model capable of performing a search even for a corpus including documents having long lengths.

According to an aspect of the present invention,

According to other aspect of the present invention,

According to another aspect of the present invention,

According to the present invention,

According to the present invention, there is provided a method for training an artificial intelligence based IR model even when the labeled data does not exist and only the corpus is given.

In addition, according to the present invention, there is provided a search method using an artificial intelligence based IR model capable of performing a search even on a corpus including documents having long lengths.

BRIEF DESCRIPTION OF THE DRAWINGS

FIG. 1 is a flow chart showing a method for training an information retrieval model based on artificial intelligence according to the present invention.

FIG. 2 is a flowchart showing an information retrieval method using an artificial intelligence based information retrieval model according to the present invention.

FIG. 3 is a diagram schematically showing an information retrieval model according to an example of the present invention.

FIG. 4 is a diagram schematically showing an apparatus for performing an information retrieval method using an artificial intelligence based information retrieval model according to the present invention.

FIG. 5 is a diagram for comparing a search result according to an embodiment of the present invention with a search result of another model.

FIG. 6 is a view comparing a search result according to an embodiment of the present invention with a search result of still another model.

FIG. 7 shows a search result integrating the search results each of which were independently performed based on queries for each part of claim 1 of a patent, that is, a preamble, a first component, and a second component of the claim 1.

DETAILED DESCRIPTION OF THE INVENTION

Hereinafter, exemplary embodiments of the present invention will be described in detail with reference to the accompanying drawings. The same or similar components are assigned the same or similar reference numerals, and redundant descriptions thereof will be omitted. In describing the embodiments disclosed in the present specification, when it is considered that a detailed description of related known technologies may obscure the subject matter of the embodiments of the present specification, the detailed description thereof will be omitted. The accompanying drawings are only for making it easier to understand the embodiments disclosed in the present specification, and the technical idea disclosed in the present specification is not limited by the accompanying drawings. It is to be understood as including all changes, equivalents, or substitutions included in the spirit and scope of the present invention.

Terms including ordinal numbers, such as first and second, can be used to describe various components, but these terms are used only for the purpose of distinguishing one component from another, and the corresponding components are not limited by these terms. Singular expressions include plural expressions, unless the context clearly indicates otherwise.

As used herein, terms such as "comprises", "includes" or "have" should be understood as limiting the existence of features, steps, elements, or combinations thereof described in the specification and it is not intended to exclude the possibility of the presence or addition of one or more features, steps, components, or combinations thereof.

FIG. 1 shows a method of training an artificial intelligence based IR model according to the present invention, and FIG. 2 shows a step of performing inference using the artificial intelligence based IR model according to the present invention. FIG. 3 schematically shows an example of an IR model according to the present invention. Hereinafter, the present invention will be described with reference to these drawings.

Training Stage of an IR Model Based on Artificial Intelligence

Information Retrieval Model

In this specification, the information retrieval model is divided into 'a retrieval model based on unsupervised learning' and 'a retrieval model based on artificial intelligence'. The former refers to an information retrieval model based on statistical or other unsupervised learning methodologies such as BM25 and QL (Query Likelihood), and the latter is an information retrieval model prepared by training, including deep learning series such as DRMM, KNRM, and PACRR, and language model series such as BERT etc.

In the present invention, the information retrieval model based on the former is used to prepare a pseudo-label in the training stage and is used to retrieve passages from the corpus in the inference stage. The latter is used to re-rank the retrieved passages in the inference stage.

Information retrieval models with open sources are disclosed in the Ad-Hoc Information Retrieval section of Paper With Code.

IR Model Based on Unsupervised Learning

As an IR model based on an unsupervised learning, BM25 and QL (Query Likelihood) are known, and Anserini is widely used as an open source package. Anserini is an IR model that uses RM3, a query expansion methodology, along with BM25. According to the results of the study, the performance of Anserini is similar to that of deep learning IR models such as DRMM, KNRM, and PACRR, but it is known to be inferior to the IR models based on language models such as BERT.

The IR model based on the unsupervised learning does determines the similarity between the query and the document based on statistical theories or other methodology.

Artificial Intelligence Based IR Model

As artificial intelligence based IR models, IR models based on deep learning such as DRMM, KNRM, and PACRR and IR models based on a transformer or language model such as BERT are known. According to Paper With Code, as of the filing date of this application, the SOTA (State-of-the-Art) IR model is the CEDR, which has a structure that combines the BERT based on a language model and an IR model based on deep learning.

The artificial intelligence based IR model is completed by training the similarity between a query and a document based on the training data. In academic fields, AI-based IR models are trained using datasets such as TREC, SQuAD, and MS Marco that provide query-document relationships.

Language model IR engines such as BERT use self-supervision learning in the pre-training stage but, in the fine-tuning stage for information retrieval, supervised learning based on the dataset of the query-document relationship is required like the AI-based IR model.

Weak Supervision Methodology

Query-document relationship datasets such as TREC, SQuAD, and MS Marco, which are used in the academic field, correspond to ground truths extracted based on actual user search activity, or using the title of a document as a query. However, in the practical field, only document corpus exists, and there is no query input by the user to search for the document. Or, even if the query exists, it is very insufficient to train an artificial intelligence based IR model. In the present invention, when only a document corpus exists, a pseudo-query is generated from each document, a pseudo query-document relationship is formed using the generated pseudo-query, and a pseudo-label is generated. In addition, a methodology for training an artificial intelligence based IR model using the pseudo-label is provided. The weak supervision methodology for an artificial intelligence based IR model according to the present invention includes the following steps: 1) generating a pseudo-query from each document in a document corpus, 2) using the pseudo-query, creating a pseudo query-document relationship and generating a pseudo-label based on the generated pseudo query-document relationship, 3) training an artificial intelligence based search model using the generated pseudo-label. Hereinafter, each of the above-described steps will be described in details.

1) Step of Creating a Pseudo-query

One or more keywords are extracted from each document in the document corpus, and this is determined as a pseudo-query. Previously known keyword extraction technique is used for extracting keywords from documents. Keyword extraction algorithms can be largely divided into techniques based on unsupervised learning and techniques based on supervised learning, and there are open sources for a number of techniques.

Most of the techniques are methods of extracting a plurality of keywords or phrases from a document, but recently, a technique called Doc2Query, which creates a natural language sentence-type query using BERT as a supervised learning based technique, has also been released as open source.

2) Step of Creating a Pseudo-label

The pseudo-query extracted from each document is used as an input of a search model based on an unsupervised learning methodology such as BM25, and M documents are retrieved from the document corpus. In this case, the document from which the pseudo-query is extracted is likely to be included in the upper rank among the M documents, but may not be included.

Among the retrieved M documents, the top m (<M) documents are labeled as positive training data, and at least some of the remaining M documents are labeled as negative training data. Depending on the AI-based search model, additional parts can be labeled as neutral training data. In general, positive data and negative data are necessary, but neutral data is not.

Here, the number of documents to be retrieved M, the number of positive training data m, the number of negative training data, and the number of neutral training data are integers, and may be determined differently according to the characteristics of the document corpus as a kind of hyper parameter. Developers can increase the accuracy of artificial intelligence based IR models by adjusting these hyperparameters in an experimental or theoretical approach according to the characteristics of the document corpus.

3) Step of Training an Artificial Intelligence Based IR Model

Since a query-document relationship is required to train an artificial intelligence based IR model, the training data is provided in the form of a relationship between a query used for retrieving and a document retrieved by the query. For example, it may be given in the form of a pair of two data such as (pseudo-query, positive document), or three data may be provided in a related form such as (pseudo-query, positive document, negative document). Of course, up to a neutral document can also be associated with four pieces of data.

The amount of data required for training is not known exactly, and is mainly confirmed by experimental methods. However, the amount of data required for training increases according to the number of parameters included in the model. BERT type language model based IR models generally have pre-learned models based on, i.e., Wikipedia data, and a small amount of data is required for fine-tuning pre-trained models according to specific tasks such as information retrieval compared with pre-learning.

In academic research, the amount of training data is determined according to the available dataset, but in the practical field, the training data can be determined according to the amount of documents included in the document corpus. If the amount of documents included in the document corpus is insufficient for training, another document of a similar field can be added to the document corpus, or the amount of data can be increased by using a data augmentation technique.

In the case of training an artificial intelligence based model, it is generally desirable to validate the performance by dividing the data into training data and validation data. For example, 80% of the data can be used for training, and the remaining 20% of the data can be used for validation.

Inference Stage

In the present invention, the inference step refers to a process of providing a search result in response to a query input by a user. The inference step can be broadly divided into the following steps: a retrieving step, a re-ranking step, and an output step. Hereinafter, each step will be described in detail.

Retrieving Step

This is a step of extracting N documents from a document corpus to be searched by an IR model based on an unsupervised learning. In general, the IR model based on artificial intelligence has a considerably longer time required for inference compared to the IR model based on the unsupervised learning. Therefore, when an artificial intelligence based IR model is applied to all documents included in the document corpus, it takes an excessively long time, and the user's convenience is degraded. Therefore, it is common to retrieve a number of documents by an IR model based on an unsupervised learning which is relatively fast first, and then an artificial intelligence based IR model is used only to the retrieved documents. Research to skip the retrieving step by improving the inference speed of the artificial intelligence based IR model is continuously being conducted, but it is understood that it has not yet reached a sufficiently fast inference speed in consideration of user convenience.

At this step, although accuracy is important, recall is more important. On the other hand, in the second re-ranking step, accuracy is more important than recall. One of the ways to increase the recall is to retrieve the number of documents several times larger than the number of documents to be provided in the search result. Another solution is to increase the recall of the IR model based on the unsupervised learning. By using a technique called DeepCT Index based on BERT, it is possible to increase the recall while using an IR model based on the same unsupervised learning. The time required for retrieving increases in proportion to the number of documents. Using the DeepCT Index, the time required for retrieval can be shortened by reducing the number of documents to be retrieved and the same level of recall as the case of retrieving several times larger number of documents can be realized.

As an IR model based on the unsupervised learning, the same IR model as used in the training step may be used, or a different IR model may be used. It is important to select an IR model with a high recall in the field. In academic research, Anserini (BM25+RM3) is widely used as an open source based IR model.

Re-ranking Step

The relevance between the retrieved N documents and the query entered by the user is evaluated by an IR model based on the unsupervised learning and arranged according to the degree of relevance. In this step, the relationship between the retrieved N documents and the query entered by the user is re-evaluated by the artificial intelligence based IR model, and then re-ordered, that is, re-ranked. This step is performed by the artificial intelligence based IR model trained in the above-described learning step.

Search Results Output Step

The N documents re-ranked by the artificial intelligence based IR model are sorted according to the order of the degree of relevance and output as a search result.

Regarding Special Cases

Regarding the Length of the Document

In general, an IR model based on unsupervised learning does not have any problem in execution even if the length of a document is long, but the IR model based on artificial intelligence often has a limit on the maximum length of a document that can be processed. In particular, AI-based search models introduced after BERT are limited in the number of maximum tokens that can be processed. For example, in the case of BERT, the maximum number of tokens that can be processed is limited to 512.

When there is a limit on the maximum length of documents that can be processed by the artificial intelligence based IR model, each document in the document corpus can be divided into passages less than the limited length and used as a search target. In this specification, a corpus of passages made of short texts is expressed as simply a 'corpus' in order to distinguish it from a 'document corpus' including long documents.

In the training stage, it is the same as described above, except that the passages included in the corpus replace documents. That is, a pseudo-query is extracted from a passage, a pseudo-label is generated using an IR model based on an unsupervised learning, and then an artificial intelligence based IR model is trained. The artificial intelligence based IR model is trained based on the relationship between the pseudo-query and the passage, but not on the relationship between the pseudo-query and the entire document.

In the inference stage, it is necessary to pre-process each document of the document corpus into a corpus by dividing it into passages, and storing the relationship between the passage and the document in a form that can be referenced. In the retrieving step, N passages are retrieved from the corpus based on a query input by the user, and in the re-ranking step, the retrieved N passages are reranked.

In the search results, documents other than passages must be provided in the order of relevance. To this end, documents are sorted so as to correspond to the sorting order of the re-ranked passages by referring to the relationship between the passage and the document, and provided as a search result. Since multiple passages are separated from one document, a plurality of passages extracted from one document may be included in the reranked result. In this case, the sorting order of a document may correspond to the order of the most relevant passage among said a plurality of passages.

Document Expansion

In the case of a long document, it contains a number of paragraphs, but the content of each paragraph does not necessarily match the subject matter of the document. Therefore, when each paragraph is divided into passages and stored as a corpus, there is a possibility that the degree of relevance is evaluated low even though the paragraph is separated from the relevant document.

To prevent this problem, the title of the document or equivalent text can be added to each passage separated from the document. In other words, the same phrase is added to each separate passage in a document. In this specification, the addition of a phrase having a relevance to the passage is expressed as a term "document extension".

The phrase corresponding to the title of a document can be generated using, for example, a text summarization technique. Document summarization techniques are largely divided into extractive summarization and abstract summarization, and both can be applied. Techniques for generating additional phrases for document expansion are not necessarily limited to the text summarization technique, and any technique capable of compressively expressing the subject of the document may be used.

For example, a query entered by a user includes a plurality of keywords, some of which are included in the original passage, but other keywords may be included in a phrase added by document expansion. Since the phrase added by document expansion includes the subject of the entire document, there is a possibility that the message contains the content intended to be searched by the user. A passage that would not have been retrieved if the phrase was not added by document expansion can be retrieved by applying document expansion. This can increase the recall of the retrieving step. As described above, it is important to have a high recall in the retrieving step.

If the length of the phrase added to the passage by document expansion is too long, the length of the passage that is increased by document expansion may exceed the length that can be processed by the artificial intelligence based IR model. In order to minimize the side effects resulting from this, it is desirable that the phrase added by document expansion be placed in the front part of the passage. This is because even if the trailing end of a passage that has been lengthened by document expansion is cut off, if the keyword included in the query entered by the user is not included in the trailing end, the passage will still be extracted in the retrieving step.

Domain Adaptiveness

When an artificial intelligence based IR model is trained using documents of a specific domain, it can be used as an IR model specialized for that domain. For example, in the case of pre-training BERT first by a universal document corpus such as Wikipedia and then fine-tunning it by documents of a specific domain, general relationship between the vocabularies is trained in the pre-learning stage, and the vocabularies specialized for the domain is trained in fine tuning stage.

An IR model adapted for a specific domain may have relatively poor performance for other domains but have improved performance for that domain.

Ensemble Model

In the above method, the results re-ranked by the artificial intelligence based IR model were used as the final search results. However, the search results may be provided using an ensemble of an IR model based on unsupervised learning and an IR model based on artificial intelligence. In this case, the final evaluation may be expressed as in Equation 1.

(Final evaluation)=$a$*(Evaluation of IR model based on unsupervised learning)+$(1-a)$*(Evaluation of artificial intelligence based IR model) [Equation 1]

In Equation 1, a is a value between 0 and 1, and may be adjusted to provide the best search result as a hyper parameter.

The ensemble model does not necessarily guarantee that the performance is improved compared to the single model, and it can be considered whether or not it is adopted depending on the domain.

FIG. 4 shows a computer device for performing the search method according to the present invention.

Since the search method and the training method according to the present invention have been described in detail with reference to FIGS. 1 to 3, an apparatus 100 for performing such a search method will be briefly described with reference to FIG. 4.

Referring to FIG. 4, the computer device 100 includes a processor 110, a nonvolatile storage unit 120 for storing programs and data, a volatile memory 130 for storing programs being executed, and an input/output unit 140 for inputting and outputting information between a user, and a bus which is an internal communication path between these units. As a running program, there may be an operating system and various applications. Although not shown, it includes a power supply unit.

In the training stage, an artificial intelligence based IR model is trained in the memory 130 by using the training data stored in the storage unit 120. In the inference stage, the unsupervised learning based IR model 210 and the artificial intelligence based IR model 220 stored in the storage unit 120 are executed in the memory 130. The corpus is stored in the storage unit 120 and the search method is performed based on a query input through the input/output unit 140.

EXAMPLE

Hereinafter, an embodiment in which the method for providing a search result according to the present invention is applied to the patent documents owned by the Korea Institute of Industrial Technology will be described.

Artificial Intelligence Based IR Model

As an artificial intelligence based IR model, the open source CEDR-KNRM model was used. In brief, the CEDR-KNRM model has an architecture that processes BERT and KNRM in parallel, and details can be checked from related papers and open source codes. According to the Paper With Code, it was confirmed that the model had the best performance at the time of implementing the embodiment, and there is no change until the filing date of this application.

Corpus

The number of patent documents to be searched was approximately 3,000, and since the length of all documents exceeded 512 tokens that could be processed by BERT, a corpus was formed by dividing each document into paragraphs. The corpus contains approximately 120,000 passages.

The relationship between each passage and the patent document from which said each passage was extracted is stored so that it can be referred to at a later stage of inference.

Pseudo-query Generation

At least one keyword or phrase was extracted as a pseudo-query by applying the keyword extraction technique to the passage formed by each paragraph of the patent document. The technique used here is RAKE whose paper and source codes are open to the public.

If same pseudo-queries was removed, approximately 40,000 pseudo-queries were generated.

Query-document Relationship Generation

Each pseudo-query was input and 300 passages were extracted from the corpus using BM25, an IR model based on unsupervised learning. Since there were approximately 40,000 pseudo-queries, the total number of extracted passages was 12,000,000. This may be a sufficient amount of data to train the CEDR-KNRM model.

Pseudo-labeling

Among the 300 passages extracted by each pseudo-query, the upper m passages were classified as positive training data, and the lower p passages were classified as negative training data. Since the CEDR-KNRM model also uses neutral training data, the remaining passages excluding the upper m passages and the lower p passages were classified as neutral training data.

Hyperparameters such as m and p were adjusted while verifying the performance of the IR model after training by the inventor reviewing the search results. Since it is a dataset without ground truth, some of the prepared training data can be used as verification data, but since it is a domain that can be verified by the inventor, the performance was verified manually.

Inference Stage

When a user inputs a query composed of a plurality of keywords, 300 passages are first retrieved from the corpus using the BM25. The retrieved 300 passages are then provided to the trained CEDR-KNRM model along with a query input by the user. The CEDR-KNRM model reranks 300 passages. The order of the patent documents is arranged to correspond to the order of the passages by inquiring the patent documents corresponding to the 300 re-ranked passages. In the case of a plurality of passages which belong to a same patent document are retrieved, the corresponding patent document are sorted according to the order of the highest-ranked passage, and the subsequent ones are ignored when sorting the corresponding patent document. Therefore, the search results are less than or equal to 300.

Compare Search Results

In FIGS. 5 and 6, the results by the search method according to the present embodiment and the results by another search method are described in comparison.

FIG. 5 is a search result among patents held by the Korea Institute of Industrial Technology by entering a query including two Korean keywords "wheelchair(hwilcheeo)" and "walking aid(juhaeng-bojo)". The left is the search result by the search method according to this embodiment and the right is the search result on KIPRIS (Korea Intellectual Property Rights Information Service). As shown in, in the search method according to the present embodiment, documents including words that exactly match the keywords "wheelchair(hwilcheeo)" and "walking aid(juhaeng-bojo)" as well as other devices that can be used by people with disabilities. While patents are searched in KIPRIS, only documents containing words that exactly match the keywords "wheelchair(hwilcheeo)" and "walking aid(juhaeng-bojo)" are searched.

FIG. 6 is a search result among patents held by the Korea Institute of Industrial Technology by entering a query including six Korean keywords such as "scanning sonar (seukaening-sona)", "safety monitoring(anjeon-gamsi)", "marine operation equipment(haeyang-unyong-jangbi)", "sea monitoring(haesang-gamsi)", and "aquaculture monitoring(yangsigjang-gamsi)". The upper side is the search result by the search method according to the present embodiment, and the lower side is the search result by Google Patent Search. Since, in the case of the Google Patent Search, the search was not performed when the number of keywords included in the query exceeded five (5), the search was performed excluding the keyword "aquaculture monitoring(yangsigjang-gamsi)". As shown, the search method according to the present embodiment searches for documents containing words that are semantically similar even though they do not exactly match the keywords included in the query, whereas the Google Patent Search provided no search result. These results are the same for KIPRIS (not shown).

As can be seen from FIGS. 5 and 6, the search method according to the present invention using an artificial intelligence based IR model does not include keywords included in the input query, but can additionally search documents that are semantically related.

In Case the Concept to Be Searched is Spread Across Multiple Paragraphs

In the above, when the length of the document is long, a method for dividing a document into multiple passages such as paragraphs and targeting them for search has been described. This method is effective when the target to be searched is concentrated on one passage in a long document, but may not be effective when the target to be searched is distributed over several parts of the document. For example, in the case of a patent, there is a difference in the content to be described in the prior art, the detailed description of the invention, and the claims, and in the detailed description of the invention, paragraphs are often divided for each component of the corresponding invention. In the case of claims, the contents are divided into independent claims and dependent claims. In the case of papers in the field of artificial intelligence, it is divided into introduction, background, dataset, model, experiment, discussions and conclusion. In some cases, the search results may not be valid.

In this case, a plurality of concepts to be searched may be searched as independent queries, and then a valid search result may be obtained by integrating each of the search results.

FIG. 7 shows, in relation to Korean Patent Application 2010-0028166, after independently performing a search based on a query for each part of claim 1, that is, a preamble, a first component, and a second component. The result of integrating each search result performed is shown. The result of simply adding all the sorting order of each search result, the evaluation result of the artificial intelligence search model (AI score), the evaluation result of the search model based on unsupervised learning (BM25 score), and the evaluation result of the ensemble model. As shown, the search target Korean Patent Application No. 2010-0028166 appears fourth in order, the AI score is 5th, the BM25 score is 1st, and the ensemble is 4th. Although the contents of other patents in the search result list have not been reviewed, it is considered that the contents would be similar to claim 1 of Korean Patent Application 2010-0028166.

The above detailed description should not be construed as limiting in any respect, but should be considered as illustrative. The scope of the present invention should be determined by rational interpretation of the appended claims, and all changes within the equivalent scope of the present invention are included in the scope of the present invention.

What is claimed is:

1. A computer-implemented method for training an artificial intelligence based information retrieval model by weak supervision, comprising the steps of:
    (a) generating, without human intervention, a pseudo-query including one or more keywords extracted from each passage in a corpus using a keyword extraction technique, the corpus being stored in a storage and including a plurality of passages;
    (b) generating, without human intervention, a pseudo-label using an information retrieval model based on unsupervised learning from the pseudo-query generated in the step (a) and the corpus; and,
    (c) training the artificial intelligence based information retrieval model using the pseudo-label generated in the step (b),
    wherein the step (b) including the steps of:
    (b1) retrieving M passages from the corpus using the information retrieval model based on unsupervised learning;
    (b2) labelling the top m passages among the M passages retrieved in the step (b1) as positive; and
    (b3) labelling at least some of the remaining passages among the M passages as negative.

2. The method according to claim 1, wherein, in the step (a), the keyword extraction technique is based on unsupervised learning.

3. An apparatus for training an artificial intelligence based information retrieval model by weak supervision, comprising:
    at least one processor;
    at least one storage storing a corpus including a plurality of passages; and
    at least one memory for storing computer-executable instructions,
    the computer-executable instructions stored in the at least one memory that are operable, when executed by the at least one processor, to perform operations including:
    (a) generating, without human intervention, a pseudo-query including one or more keywords extracted from each passage in a corpus using a keyword extraction technique;
    (b) generating, without human intervention, a pseudo-label using an information retrieval model based on unsupervised learning from the pseudo-query generated in the step (a) and the corpus; and,
    (c) training the artificial intelligence based information retrieval model using the pseudo-label generated in the step (b),
    wherein the step (b) including the steps of:
    (b1) retrieving M passages from the corpus using the information retrieval model based on unsupervised learning;
    (b2) labelling the top m passages among the M passages retrieved in the step (b1) as positive; and (b3) labelling at least some of the remaining passages among the M passages as negative.

4. The method according to claim 3, wherein the keyword extraction technique is based on unsupervised learning.

\* \* \* \* \*